United States Patent
Patten et al.

(10) Patent No.: US 9,884,692 B2
(45) Date of Patent: *Feb. 6, 2018

(54) SYSTEMS AND METHODS FOR CONTROLLING ROTATION AND TWIST OF A TETHER

(71) Applicant: X Development LLC, Mountain View, CA (US)

(72) Inventors: Elias Wolfgang Patten, Seattle, WA (US); Damon Vander Lind, Alameda, CA (US); Bryan Christopher GilroySmith, San Francisco, CA (US); Brian Hachtmann, San Martin, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 243 days.

This patent is subject to a terminal disclaimer.

(21) Appl. No.: 14/586,909

(22) Filed: Dec. 30, 2014

(65) Prior Publication Data
US 2015/0375874 A1 Dec. 31, 2015

Related U.S. Application Data

(60) Provisional application No. 62/019,273, filed on Jun. 30, 2014.

(51) Int. Cl.
  *B64F 3/02* (2006.01)
  *F03D 7/02* (2006.01)
  *B64C 39/02* (2006.01)

(52) U.S. Cl.
  CPC ............. *B64F 3/02* (2013.01); *F03D 7/02* (2013.01); *F05B 2240/921* (2013.01); *Y02E 10/723* (2013.01)

(58) Field of Classification Search
  CPC ... B64C 2201/148; B64C 39/022; B64F 3/00; B64F 3/02; F03D 5/00; B64B 1/50; B64B 1/56
  See application file for complete search history.

(56) References Cited

U.S. PATENT DOCUMENTS

| 6,628,338 | B1 | 9/2003 | Elberbaum et al. |
| 7,317,261 | B2 * | 1/2008 | Rolt ...................... B64C 39/022 244/24 |

(Continued)

FOREIGN PATENT DOCUMENTS

| TW | 360552 | 6/1999 |
| WO | WO 2013/100849 | 7/2013 |
| WO | WO2013/052178 | 9/2013 |

OTHER PUBLICATIONS

International Search Report and Written Opinion prepared by the Korean Patent Office in International Application No. PCT/US2015/037091 dated Sep. 24, 2015.

(Continued)

*Primary Examiner* — Medhat Badawi
*Assistant Examiner* — Christopher D Hutchens
(74) *Attorney, Agent, or Firm* — McDonnell Boehnen Hulbert & Bergoff LLP

(57) ABSTRACT

A system may include a tether, a slip ring, a tether gimbal assembly, a drive mechanism, a control system. The tether may include a distal tether end coupled to an aerial vehicle, a proximate tether end, and at least one insulated electrical conductor coupled to the aerial vehicle. The slip ring may include a fixed portion and a rotatable portion, where the rotatable portion is coupled to the tether. The tether gimbal assembly may be rotatable about at least one axis and is coupled to the fixed portion of the slip ring. The drive mechanism may be coupled to the slip ring and configured (Continued)

to rotate the rotatable portion of the slip ring. And the control system may be configured to operate the drive mechanism to control twist in the tether.

8 Claims, 12 Drawing Sheets

(56) References Cited

U.S. PATENT DOCUMENTS

| | | |
|---|---|---|
| 8,083,174 B2 | 12/2011 | Lee |
| 8,247,912 B2 | 8/2012 | Da Costa Duarte Pardal et al. |
| 8,350,403 B2 | 1/2013 | Carroll |
| 8,791,585 B2 | 7/2014 | Calverley |
| 9,211,951 B2 | 12/2015 | Hachtmann et al. |
| 9,214,022 B1 | 12/2015 | Hallamask et al. |
| 9,216,824 B2* | 12/2015 | Hachtmann ............ B64C 39/022 |
| 2007/0176432 A1* | 8/2007 | Rolt ...................... B64C 39/022 |
| | | 290/55 |
| 2008/0265086 A1* | 10/2008 | Lee ......................... B64B 1/50 |
| | | 244/30 |
| 2010/0013236 A1 | 1/2010 | Carroll |
| 2010/0230546 A1 | 9/2010 | Bevirt et al. |
| 2010/0295303 A1 | 11/2010 | Lind |
| 2011/0101692 A1 | 5/2011 | Bilaniuk |
| 2011/0266395 A1 | 11/2011 | Bevirt |
| 2013/0221679 A1 | 8/2013 | Vander Lind |
| 2015/0041598 A1* | 2/2015 | Nugent .................. H02J 17/00 |
| | | 244/53 R |
| 2015/0054282 A1* | 2/2015 | Goldstein ................ F03D 5/00 |
| | | 290/44 |
| 2015/0158585 A1 | 6/2015 | Hachtmann et al. |
| 2015/0158586 A1 | 6/2015 | Hachtmann et al. |
| 2015/0180186 A1 | 6/2015 | Vander Lind et al. |
| 2015/0275861 A1* | 10/2015 | Goldstein .............. F03D 9/002 |
| | | 290/44 |
| 2015/0375874 A1 | 12/2015 | Patten et al. |

OTHER PUBLICATIONS

International Search Report and Written Opinion prepared by the Korean Patent Office in International Application No. PCT/US2015/037284 dated Sep. 25, 2015.

* cited by examiner

SYSTEMS AND METHODS FOR CONTROLLING ROTATION AND TWIST OF A TETHER

CROSS-REFERENCE TO RELATED APPLICATION

This application claims priority to U.S. Provisional Application No. 62/019,273, filed Jun. 30, 2014. The entire disclosure contents of U.S. Provisional Application No. 62/019,273 are herewith incorporated by referenced into the present application.

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

Systems and methods for controlling rotation and twist of a tether are described herein. More specifically, example embodiments generally relate to systems that incorporate a ground station for tethering aerial vehicles. During certain flight modes, the tether connecting the aerial vehicle to the ground station may twist as the aerial vehicle orbits about an axis relative to the ground station. Beneficially, embodiments described herein may control rotation and twist of the tether so as to avoid breaking components of the tether and/or improve a fatigue life of the tether.

In one aspect, an example system may include a tether that includes a distal tether end coupled to an aerial vehicle, a proximate tether end, and at least one insulated electrical conductor coupled to the aerial vehicle; a slip ring that includes a fixed portion and a rotatable portion, where the rotatable portion is coupled to the tether; a tether gimbal assembly, where the tether gimbal assembly is rotatable about at least one axis and is coupled to the fixed portion of the slip ring; a drive mechanism coupled to the slip ring and configured to rotate the rotatable portion of the slip ring relative to the fixed portion; and a control system configured to operate the drive mechanism to control twist in the tether.

In another aspect, a system may include a ground station; a tether that includes a distal tether end coupled to an aerial vehicle, a proximate tether end, and at least one insulated electrical conductor coupled to the aerial vehicle, a slip ring that includes a fixed portion and a rotatable portion, where the fixed portion is coupled to the ground station and the rotatable portion is coupled to the tether; a tether gimbal assembly, where the tether gimbal assembly is rotatable about at least one axis, and where the tether passes through the tether gimbal assembly; a drive mechanism coupled to the slip ring and configured to rotate the rotatable portion of the slip ring relative to the fixed portion; and a control system configured to operate the drive mechanism to control twist in the tether.

In another aspect, a system may include a tether that includes a distal tether end coupled to an aerial vehicle; a proximate tether end; and at least one insulated electrical conductor coupled to the aerial vehicle; a slip ring comprising a fixed portion and a rotatable portion, where the rotatable portion is coupled to the tether; a tether gimbal assembly, where the tether gimbal assembly is rotatable about at least one axis; and a resistive bearing system coupled to the slip ring, where the resistive bearing system is configured to allow the rotatable portion of the slip ring to rotate relative to the fixed portion when a torque provided by the tether exceeds a slip limit, and further configured to inhibit the rotation of the rotatable portion of the slip ring relative to the fixed portion when the torque provided by the tether does not exceed the slip limit.

In another aspect, a system may include a tether that includes a distal tether end coupled to an aerial vehicle; a proximate tether end; and at least one insulated electrical conductor coupled to the aerial vehicle; a slip ring comprising a fixed portion and a rotatable portion, where the rotatable portion is coupled to the tether; a tether gimbal assembly, where the tether gimbal assembly is rotatable about at least one axis; and a resistive bearing system coupled to the slip ring, where the resistive bearing system is configured to allow the rotatable portion of the slip ring to rotate relative to the fixed portion and to provide a resistance to the rotational torque of the tether so as to maintain the twist in the tether within a determined range of values.

In another aspect, a method may involve launching an aerial vehicle connected to a tether, transitioning the aerial vehicle to crosswind flight, and controlling, by a control system, an amount of twist in the tether during crosswind flight.

In yet another aspect, a system may include means for launching an aerial vehicle connected to a tether, means for transitioning the aerial vehicle to crosswind flight, and means for controlling an amount of twist in the tether during crosswind flight.

In another aspect, a system may include a tether that includes a distal tether end coupled to an aerial vehicle; a proximate tether end; and at least one insulated electrical conductor coupled to the aerial vehicle; a tether gimbal assembly, where the tether gimbal assembly is coupled to the tether and is rotatable about at least one axis; a drive mechanism coupled to the tether and configured to rotate the tether; and a control system configured to operate the drive mechanism to control twist in the tether.

In another aspect, a system may include a tether that includes a distal tether end coupled to an aerial vehicle; a proximate tether end; and at least one insulated electrical conductor coupled to the aerial vehicle; a slip ring comprising a fixed portion and a rotatable portion, wherein the rotatable portion is coupled to the tether; a tether gimbal assembly, wherein the tether gimbal assembly is rotatable about at least one axis and is coupled to the fixed portion of the slip ring; a drive mechanism coupled to the slip ring and configured to rotate the rotatable portion of the slip ring relative to the fixed portion; and a control system configured to operate the drive mechanism to control twist in the tether.

In another aspect, a system may include a tether that includes a distal tether end coupled to an aerial vehicle; a proximate tether end; and at least one insulated electrical conductor coupled to the aerial vehicle; a tether gimbal assembly, where the tether gimbal assembly is coupled to the tether and is rotatable about at least one axis; and a resistive bearing system coupled to the tether gimbal assembly, where the resistive bearing system is configured to allow the proximate tether end to rotate when a torque at the proximate tether end exceeds a slip limit, and further configured to inhibit the rotation of the proximate tether end when the torque does not exceed the slip limit.

In yet another aspect, a system may include a tether that includes a distal tether end coupled to an aerial vehicle; a proximate tether end; and at least one insulated electrical conductor coupled to the aerial vehicle; a tether gimbal assembly, where the tether gimbal assembly is coupled to the tether and is rotatable about at least one axis; and a resistive bearing system coupled to the tether gimbal assembly, where the resistive bearing system is configured to allow the proximate tether end to rotate and to provide a resistance to the rotational torque of the tether so as to maintain the twist in the tether within a determined range of values.

These as well as other aspects, advantages, and alternatives, will become apparent to those of ordinary skill in the art by reading the following detailed description, with reference where appropriate to the accompanying drawings.

DETAILED DESCRIPTION

Figure 1:
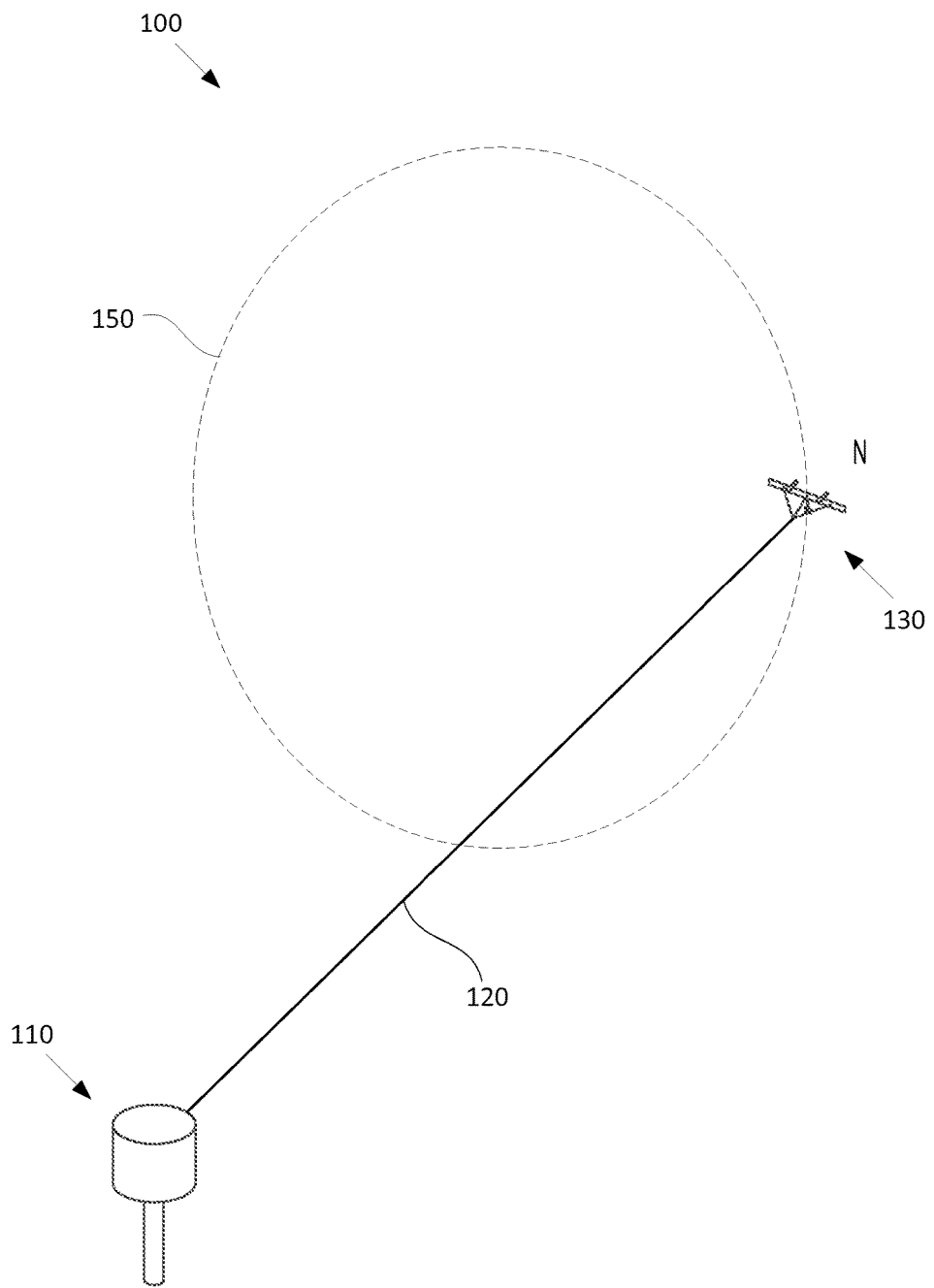
FIG. 1 depicts an Airborne Wind Turbine (AWT), according to an example embodiment.

Exemplary systems and methods are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems and methods can be arranged and combined in a wide variety of different configurations, all of which are contemplated herein.

I. OVERVIEW

Illustrative embodiments relate to aerial vehicles, which may be used in a wind energy system, such as an Airborne Wind Turbine (AWT). In particular, illustrative embodiments may relate to or take the form of systems for controlling rotation and twist of a tether that connects an aerial vehicle to a ground station.

By way of background, an AWT may include an aerial vehicle that flies in a closed path, such as a substantially circular path, to convert kinetic wind energy to electrical energy. In an illustrative implementation, the aerial vehicle may be connected to a ground station via a tether. While tethered, the aerial vehicle can: (i) fly at a range of elevations and substantially along the path, and return to the ground, and (ii) transmit electrical energy to the ground station via the tether. (In some implementations, the ground station may transmit electricity to the aerial vehicle for take-off and/or landing.)

In an AWT, an aerial vehicle may rest in and/or on a ground station (or perch) when the wind is not conducive to power generation. When the wind is conducive to power generation, such as when a wind speed may be 3.5 meters per second (m/s) at an altitude of 200 meters (m), the ground station may deploy (or launch) the aerial vehicle. In addition, when the aerial vehicle is deployed and the wind is not conducive to power generation, the aerial vehicle may return to the ground station.

Moreover, in an AWT, an aerial vehicle may be configured for hover flight and crosswind flight. Crosswind flight may be used to travel in a motion, such as a substantially circular motion, and thus may be the primary technique that is used to generate electrical energy. Hover flight in turn may be used by the aerial vehicle to prepare and position itself for crosswind flight. In particular, the aerial vehicle could ascend to a location for crosswind flight based at least in part on hover flight. Further, the aerial vehicle could take-off and/or land via hover flight.

In hover flight, a span of a main wing of the aerial vehicle may be oriented substantially parallel to the ground, and one or more propellers of the aerial vehicle may cause the aerial vehicle to hover over the ground. In some implementations, the aerial vehicle may vertically ascend or descend in hover flight. Moreover, in crosswind flight, the aerial vehicle may be oriented, such that the aerial vehicle may be propelled by the wind substantially along a closed path, which as noted above, may convert kinetic wind energy to electrical energy. In some implementations, one or more rotors of the aerial vehicle may generate electrical energy by slowing down the incident wind.

During crosswind flight, the tether connecting the aerial vehicle to the ground station may twist as the aerial vehicle orbits about an axis relative to the ground station. In some implementations, the amount of twist between the ground station end of the tether and the aerial vehicle end of the tether may vary based on a number of parameters during crosswind flight. Twist in the tether may have beneficial or detrimental effects on the system, depending on the system design and operating parameters.

Embodiments described herein may allow for controlling the rotation and twist of the tether for maximum benefit. In an illustrative implementation, a system may control the rotation, and amount of twist, of the tether when the tether is orbiting during crosswind flight of the aerial vehicle. In the case of a tether with electrical conductor(s), it may be desirable to maintain the twist in the tether within a certain range to reduce a strain of the conductors. Beneficially, such a reduction of the strain may avoid breaking the conductors and/or may improve a fatigue life of the tether.

In some implementations, a system may include a tether, a tether gimbal assembly, a slip ring, a drive mechanism, and a control system. In an example embodiment, the control system may be configured to operate the drive mechanism to rotate the slip ring and the tether in order to control the amount of twist in the tether. With this arrangement, the amount of twist in the tether during crosswind flight of the aerial vehicle may be actively controlled.

Moreover, in some implementations, a system may include a tether, a tether gimbal assembly, a slip ring, and a resistive bearing system. In an example embodiment, the resistive bearing system may be used to passively control tether twist during crosswind flight of the aerial vehicle. For example, the resistive bearing system may inhibit or prevent rotation of the slip ring and tether when the applied torque from a twisted tether is below a threshold level (which may be referred to as a slip limit). When the applied torque from a twisted tether is above the slip limit, the bearing system may allow the slip ring and tether to rotate.

As another example, the resistive bearing system may be configured to allow the rotatable portion of the slip ring to rotate relative to the fixed portion and to provide a resistance (e.g., friction) to the rotational torque of the tether so as to maintain the twist in the tether within a determined range of values.

Other embodiments may relate to methods for controlling rotation and twist of a tether. For instance, some implementations may involve launching an aerial vehicle connected to a tether, transitioning the aerial vehicle to crosswind flight, and controlling, by a control system, an amount of twist in the tether during crosswind flight.

II. ILLUSTRATIVE SYSTEMS

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the tether 120 may be connected to the aerial vehicle on a first end and may be connected to the ground station 110 on a second end. In this example, the tether 120 may be attached to the ground station 110 at one location on the ground station 110, and attached to the aerial vehicle 130 at three locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, crosswind flight, and other flight modes, such as forward flight (which may be referred to as airplane-like flight). In some implementations, a ground station 110 may be configured for use on land. However, a ground station 110 may also be implemented on a body of water, such as a lake, river, sea, or ocean. For example, a ground station could include or be arranged on a floating off-shore platform or a boat, among other possibilities. Further, a ground station 110 may be configured to remain stationary or to move relative to the ground or the surface of a body of water.

In addition, the ground station 110 may include one or more components (not shown), such as a winch, that may vary a length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

The aerial vehicle 130 may be configured to fly substantially along a closed path 150 to generate electrical energy. The term "substantially along," as used in this disclosure, refers to exactly along and/or one or more deviations from exactly along that do not significantly impact generation of electrical energy.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction.

The closed path 150 may be various different shapes in various different embodiments. For example, the closed path 150 may be substantially circular. And in at least one such example, the closed path 150 may have a radius of up to 265 meters. The term "substantially circular," as used in this disclosure, refers to exactly circular and/or one or more deviations from exactly circular that do not significantly impact generation of electrical energy as described herein. Other shapes for the closed path 150 may be an oval, such as an ellipse, the shape of a jelly bean, the shape of the number of 8, etc.

The aerial vehicle 130 may be operated to travel along one or more revolutions of the closed path 150. As shown in FIG. 1, the number of revolutions of the closed path 150 that the aerial vehicle 130 has traveled along may be represented by N.

B. Illustrative Components of an AWT

Figure 2:
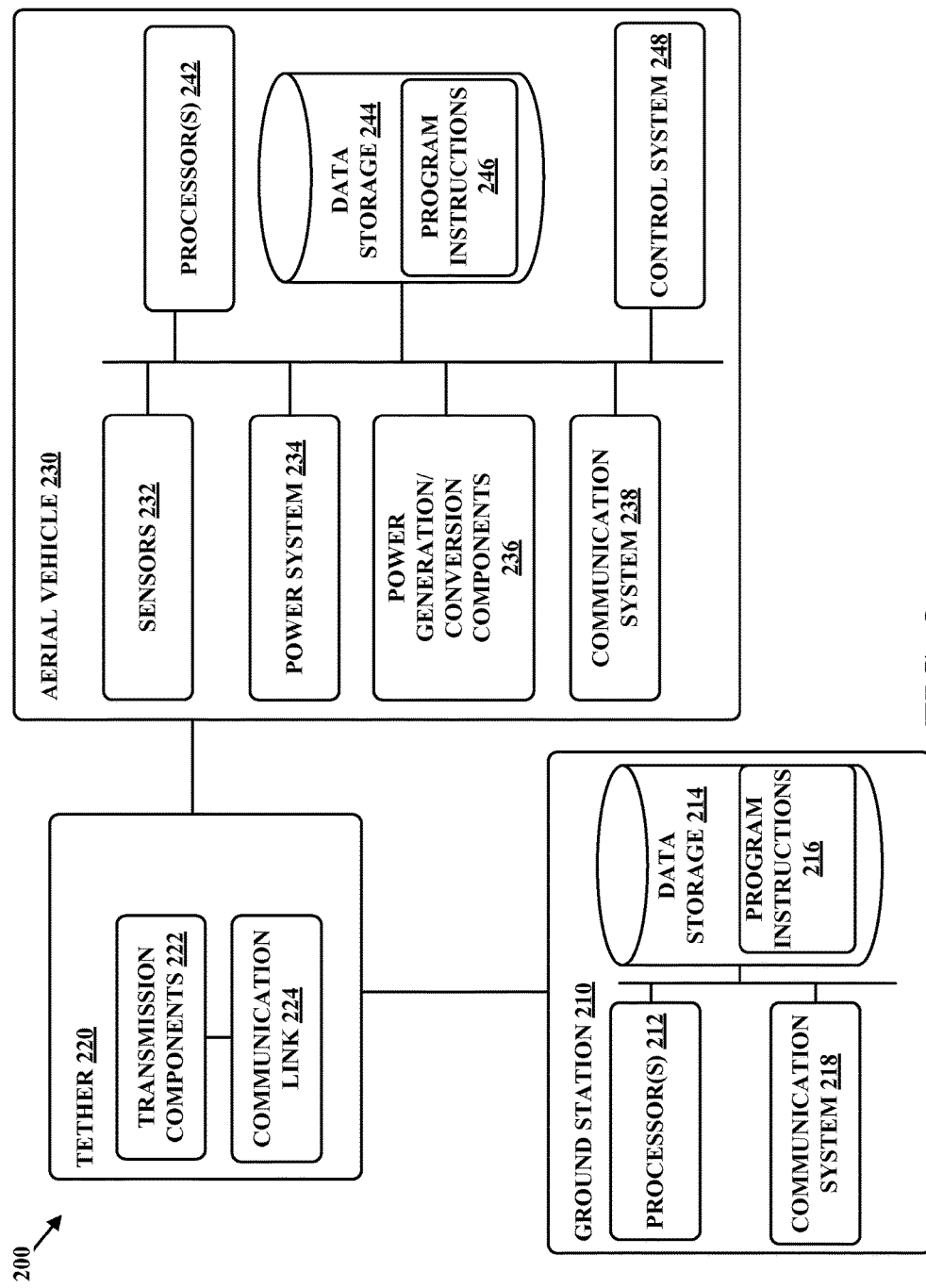
FIG. 2 is a simplified block diagram illustrating components of an AWT, according to an example embodiment.

FIG. 2 is a simplified block diagram illustrating components of the AWT 200. The AWT 100 may take the form of or be similar in form to the AWT 200. In particular, the AWT 200 includes a ground station 210, a tether 220, and an aerial vehicle 230. The ground station 110 may take the form of or be similar in form to the ground station 210, the tether 120 may take the form of or be similar in form to the tether 220, and the aerial vehicle 130 may take the form of or be similar in form to the aerial vehicle 230.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communication system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command center, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able to mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU. In addition, the aerial vehicle 230 may include one or more load cells configured to detect forces distributed between a connection of the tether 220 to the aerial vehicle 230.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 236 could take various different forms in various different embodiments. For example, the power generation/conversion components 236 may include one or more generators, such as high-speed, direct-drive generators. With this arrangement, the one or more generators may be driven by one or more rotors. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 246, and the data storage 244. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 220 and/or the tether 120.

C. Illustrative Aerial Vehicle

Figure 3:
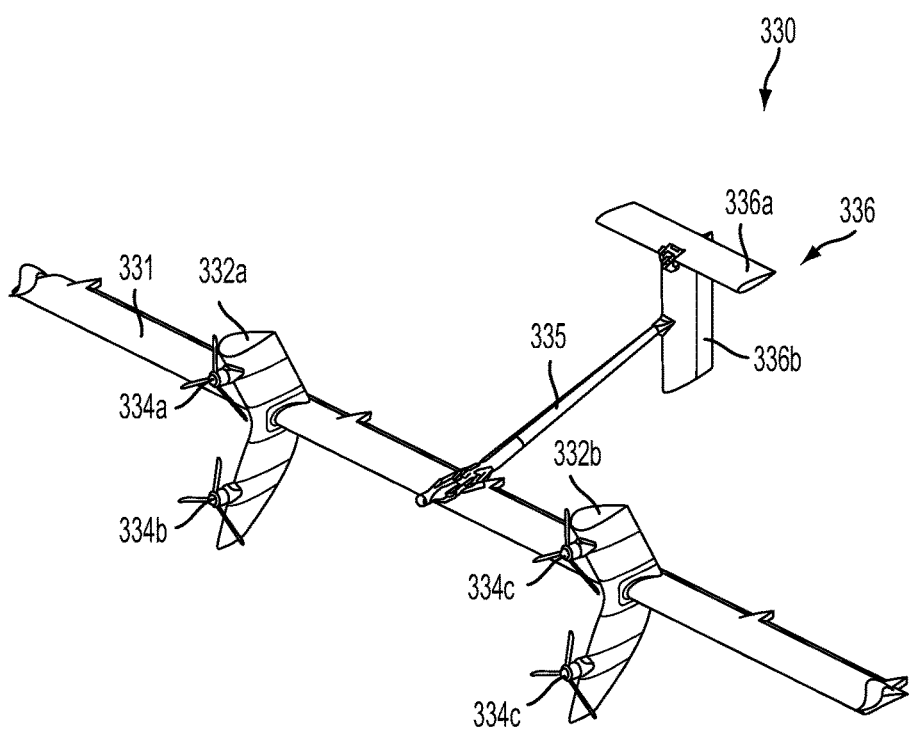
FIG. 3 depicts an aerial vehicle, according to an example embodiment.

FIG. 3 depicts an aerial vehicle 330, according to an example embodiment. The aerial vehicle 130 and/or the aerial vehicle 230 may take the form of or be similar in form to the aerial vehicle 330. In particular, the aerial vehicle 330 may include a main wing 331, pylons 332a, 332b, rotors 334a, 334b, 334c, 334d, a tail boom 335, and a tail wing assembly 336. Any of these components may be shaped in any form which allows for the use of components of lift to resist gravity and/or move the aerial vehicle 330 forward.

The main wing 331 may provide a primary lift force for the aerial vehicle 330. The main wing 331 may be one or more rigid or flexible airfoils, and may include various control surfaces, such as winglets, flaps (e.g., Fowler flaps, Hoerner flaps, split flaps, and the like), rudders, elevators, spoilers, dive brakes, etc. The control surfaces may be used to stabilize the aerial vehicle 330 and/or reduce drag on the aerial vehicle 330 during hover flight, forward flight, and/or crosswind flight.

The main wing 331 and pylons 332a, 332b may be any suitable material for the aerial vehicle 330 to engage in hover flight, forward flight, and/or crosswind flight. For example, the main wing 331 and pylons 332a, 332b may include carbon fiber and/or e-glass, and include internal supporting spars or other structures. Moreover, the main wing 331 and pylons 332a, 332b may have a variety of dimensions. For example, the main wing 331 may have one or more dimensions that correspond with a conventional wind turbine blade. As another example, the main wing 331 may have a span of 8 meters, an area of 4 meters squared, and an aspect ratio of 15.

The pylons 332a, 332b may connect the rotors 334a, 334b, 334c, and 334d to the main wing 331. In some examples, the pylons 332a, 332b may take the form of, or be similar in form to, a lifting body airfoil (e.g., a wing). In some examples, a vertical spacing between corresponding rotors (e.g., rotor 334a and rotor 334b on pylon 332a) may be 0.9 meters.

The rotors 334a, 334b, 334c, and 334d may be configured to drive one or more generators for the purpose of generating electrical energy. In this example, the rotors 334a, 334b, 334c, and 334d may each include one or more blades, such as three blades or four blades. The rotor blades may rotate via interactions with the wind and be used to drive the one or more generators. In addition, the rotors 334a, 334b, 334c, and 334d may also be configured to provide thrust to the aerial vehicle 330 during flight. With this arrangement, the rotors 334a, 334b, 334c, and 334d may function as one or more propulsion units, such as a propeller. Although the rotors 334a, 334b, 334c, and 334d are depicted as four rotors in this example, in other examples the aerial vehicle 330 may include any number of rotors, such as less than four rotors or more than four rotors.

A tail boom 335 may connect the main wing 331 to the tail wing assembly 336, which may include a tail wing 336a and a vertical stabilizer 336b. The tail boom 335 may have a variety of dimensions. For example, the tail boom 335 may have a length of 2 meters. Moreover, in some implementations, the tail boom 335 could take the form of a body and/or fuselage of the aerial vehicle 330. In such implementations, the tail boom 335 may carry a payload.

The tail wing 336a and/or the vertical stabilizer 336b may be used to stabilize the aerial vehicle 330 and/or reduce drag on the aerial vehicle 330 during hover flight, forward flight, and/or crosswind flight. For example, the tail wing 336a and/or the vertical stabilizer 336b may be used to maintain a pitch of the aerial vehicle 330 during hover flight, forward flight, and/or crosswind flight. The tail wing 336a and the vertical stabilizer 336b may have a variety of dimensions. For example, the tail wing 336a may have a length of 2 meters. Moreover, in some examples, the tail wing 336a may have a surface area of 0.45 meters squared. Further, in some examples, the tail wing 336a may be located 1 meter above a center of mass of the aerial vehicle 330.

While the aerial vehicle 330 has been described above, it should be understood that the systems and methods described herein could involve any suitable aerial vehicle that is connected to an airborne wind turbine tether, such as the tether 120 and/or the tether 220.

D. Illustrative Tether Twist

Figure 4C:
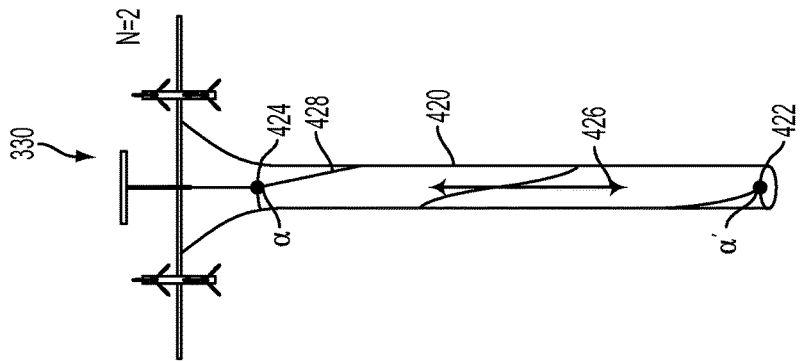
FIGS. 4a-c illustrate twist in a tether, according to an example embodiment.
Figure 4B:
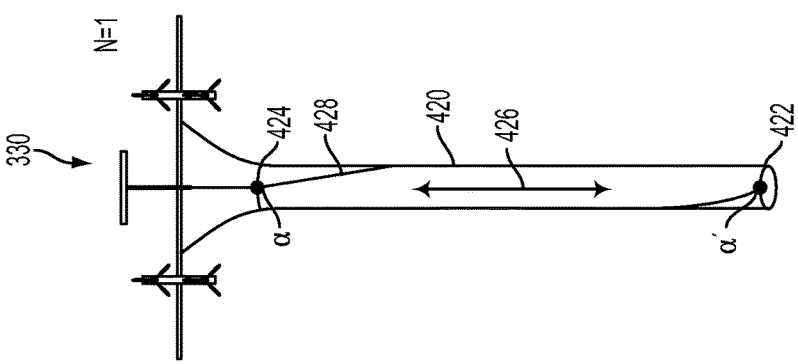
Figure 4A:
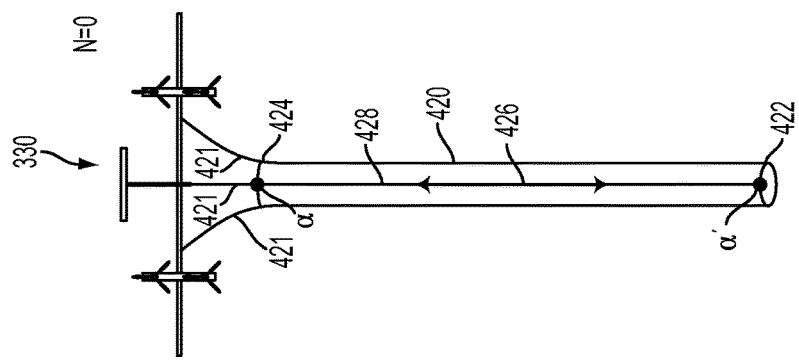

FIGS. 4a-c depict twist in a tether 420, according to an example embodiment. The tether 120 and/or the tether 220 may take the form of or be similar in form to the tether 420. Referring to FIG. 4a, the tether 420 includes a bridal portion 421, a proximate tether end 422, a distal tether end 424, and a long axis 426 that extends between the proximate tether end 422 and the distal tether end 424. In the illustrated example, the distal tether end 424 is coupled to the aerial vehicle 330. The proximate tether end 422 may be coupled to a ground station (not shown), such as the ground station 110 and/or the ground station 210. In addition, the tether 420 may include at least one insulated electrical conductor (not shown) coupled to the aerial vehicle 330. FIGS. 4a-c, and remaining Figures depicting tethers, are for illustrative purposes only and may not reflect all components or connections. Further, as illustrations the Figures may not reflect actual operating conditions, but are merely to illustrate embodiments described. For example, while a straight cylinder may be used to illustrate the described tether embodiments, during orbiting crosswind flight the tether may in practice exhibit some level of droop between the ground station and the aerial vehicle. Further still, the relative dimensions in the Figures may not be to scale, but are merely to illustrate the embodiments described.

FIGS. 4a-c illustrate twist in the tether 420 between the proximate tether end 422 and the distal tether end 424 as the aerial vehicle 330 travels along a closed path, such as the closed path 150. In some embodiments, an amount of twist in the tether 420 may be measured as an angular distance between a point $\alpha$ on the tether 420 at the distal tether end 424 and a point $\alpha'$ on the tether 420 at the proximate tether end 422. Other measurement points are also possible. For example, an amount of twist may be at two or more points located between the distal tether end 424 and the proximate tether end 422. As shown in FIGS. 4a-c, an amount of twist in the tether 420 may increase as the number of revolutions of the closed path, N, that the aerial vehicle 330 has traveled along increases.

For example, as shown in FIG. 4a, when N=0, an illustrative reference line 428 on the tether 420 may extend between the point $\alpha$ and the point $\alpha'$ that is substantially parallel to the long axis 426. With this arrangement, the angular distance between the point $\alpha$ and the point $\alpha'$ may be substantially zero. Accordingly, the amount of twist in the tether 420 may be substantially zero.

The term "substantially parallel," as used in the disclosure, refers to exactly parallel or one or more deviations from exactly parallel that do not significantly impact controlling rotation and twist of a tether as described herein. In addition, the term "substantially zero," as used in this disclosure, refers to exactly zero or one or more deviations from zero that do not significantly impact controlling rotation and twist of a tether as described herein.

As shown in FIG. 4b, after the aerial vehicle 330 completes one orbit, and thus N=1, the tether may twist about the long axis 426. Thus reference line 428 may form a helix around the long axis 426. With this arrangement, when N=1, the angular distance between the point $\alpha$ and the point $\alpha'$ may be greater than the angular distance between the point $\alpha$ and the point $\alpha'$ when N=0. Accordingly, when N=1, an amount of twist in the tether 420 may be greater than an amount of twist in the tether 420 when N=0.

Further, as shown in FIG. 4c, after the aerial vehicle 330 completes two orbits, and thus N=2, the tether may further twist about the long axis 426. In the illustrated example, the helical pitch of reference line 428 may be greater than the helical pitch of the reference line 428 in FIG. 4b. With this arrangement, when N=2, the angular distance between the point $\alpha$ and the point $\alpha'$ may be greater than the angular distance between the point $\alpha$ and the point $\alpha'$ when N=1. Accordingly, when N=2, an amount of twist in the tether 420 may be greater than an amount of twist in the tether 420 when N=1.

E. Aerial Vehicle Coupled to a Ground Station Via a Tether

Figure 5A:
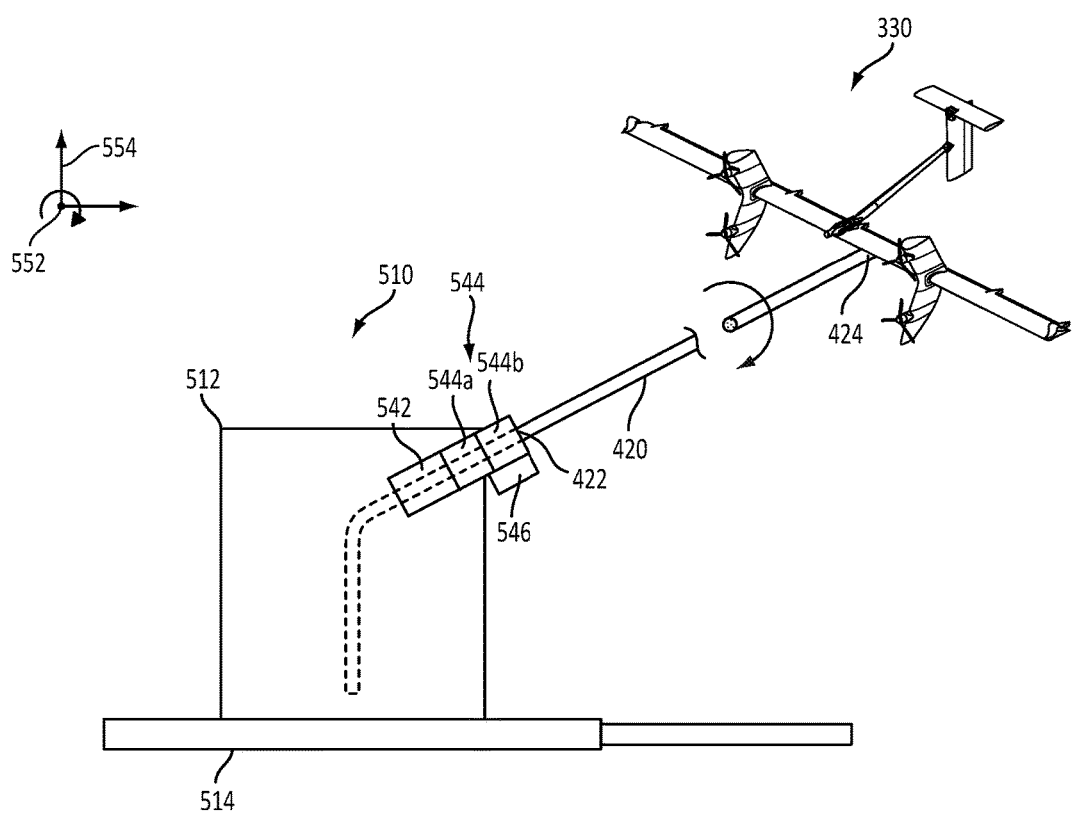
FIG. 5a depicts an aerial vehicle coupled to a ground station via a tether, according to an example embodiment.

FIG. 5a depicts the aerial vehicle 330 coupled to a ground station 510 via the tether 420, according to an example embodiment. Referring to FIG. 5a, the ground station 510 may include a winch drum 512 and a platform 514. The ground station 110 and/or the ground station 210 may take the form of or be similar in form to the ground station 510. FIG. 5a is for illustrative purposes only and may not reflect all components or connections.

As shown in FIG. 5a, the tether 420 may be coupled to a tether gimbal assembly 542 at the proximate tether end 422 and to the aerial vehicle 330 at the distal tether end 424. Moreover, as shown in FIG. 5a, the tether gimbal assembly 542 may also be coupled to the winch drum 512 which in turn may be coupled to the platform 514. A slip ring 544 located between the tether 420 and the tether gimbal assembly 542 may allow the tether 420 to rotate about the long axis 426 of the tether 420 (as shown in, and described with respect to, FIGS. 4a-c) relative to the ground station 510.

In some embodiments, the tether gimbal assembly 542 may be configured to rotate about one or more axes, such as a horizontal axis 552 and an azimuth axis 554, in order to allow the proximate tether end 422 to move in those axes in response to movement of the aerial vehicle 330. Moreover, in some embodiments, the slip ring 544 may include a fixed portion 544a, a rotatable portion 544b, and one or more insulated electrically conductive pathways (not shown). The rotatable portion 544b may be coupled to the tether 420. The fixed portion 544a may be coupled to the tether gimbal assembly 542. The one or more insulated electrically conductive pathways may provide an electrical connection between one or more electrical conductors in the tether, and one or more ground-side electrical connections (not shown).

The use of the word fixed in the fixed portion 544a of the slip ring 544 is not intended to limit fixed portion 544a to a stationary configuration. In this example, the fixed portion 544a may move in axes described by the tether gimbal assembly 542 (e.g., the horizontal axis 552 and azimuth axis 554), and may rotate about the ground station 510 as the winch drum 512 rotates, but the fixed portion 544a will not rotate about the tether 420, i.e., with respect to the long axis 426 of the tether. Moreover, in this example, the rotatable portion 544b of the slip ring 544 may be coupled to the tether gimbal assembly 542 and configured to substantially rotate with the rotation of tether 420.

As shown in FIG. 5a, a drive mechanism 546 may be coupled to the rotatable portion 544b and configured to rotate the rotatable portion 544b (and consequently the proximate tether end 422) relative to the stationary portion 544a. As an example, the drive mechanism 546 may include a servo motor.

Via the slip ring 544, the tether 420 may rotate about its centerline along the long axis 426 as the aerial vehicle 330 orbits. The distal tether end 424 may rotate a different amount than the proximate tether end 422, resulting in an amount of twist along the length of the tether 420. With this arrangement, the amount of twist in the tether 420 may vary based on a number of parameters during crosswind flight of the aerial vehicle 330.

Figure 5B:
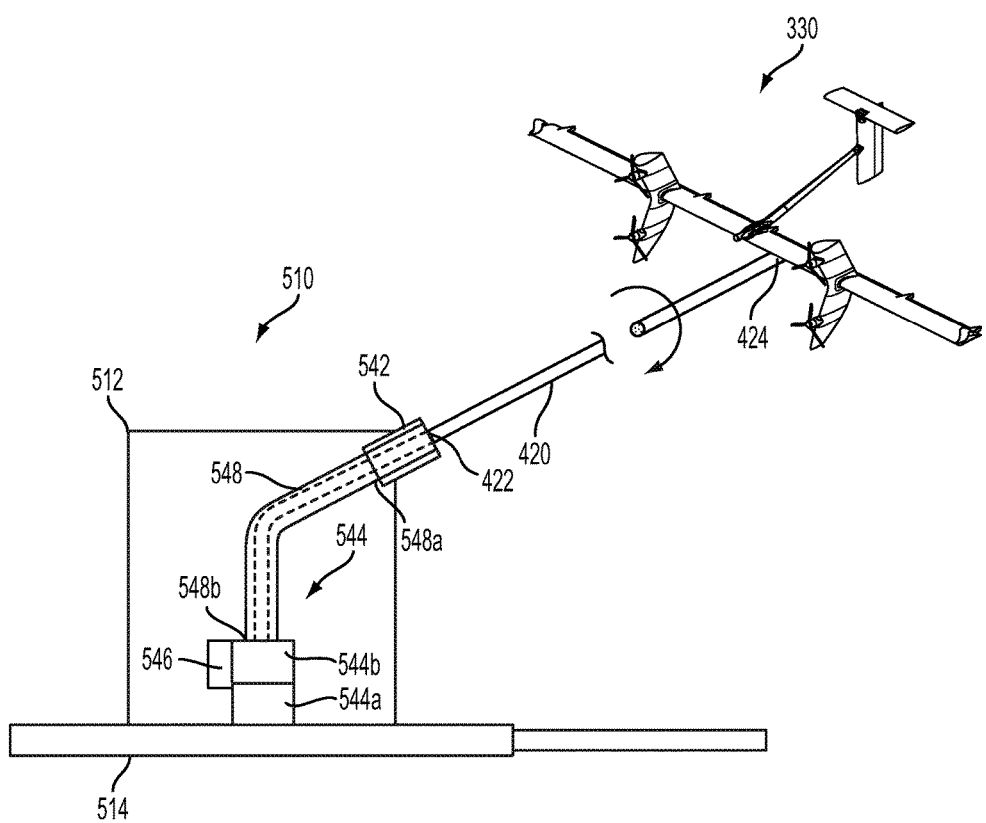
FIG. 5b depicts an aerial vehicle coupled to a ground station via a tether, according to an example embodiment.

In a further aspect, the slip ring 544 may not be coupled to the tether gimbal assembly 542. For example, as shown in FIG. 5b, the slip ring 544 may be near the platform 514. As such, the tether 420 may pass through the tether gimbal assembly 542. In the illustrated example, the fixed portion 544a of the slip ring 544 may be coupled to platform 514, the winch drum 512, or another component of the ground station 510 and the tether 420 may be coupled to the rotatable portion 544b of the slip ring 544 at the proximate tether end 422. The other connections of the aerial vehicle 330, the winch drum 512, the platform 514, the tether gimbal assembly 542, and the drive mechanism 546, as well as other connections, may be described with respect to FIG. 5a.

In some embodiments, a flexible coupling 548 may be used to route the tether 420 from the tether gimbal assembly 542 to the slip ring 544. As shown in FIG. 5b, the flexible coupling 548 includes a first end 548a and a second end 548b. The first end 548a of the flexible coupling 548 may be coupled to the tether gimbal assembly 542 and the second end 548b of the flexible coupling 548 may be coupled to the rotatable portion 544b of the slip ring 544.

Moreover, in some embodiments, the tether 420 may be coupled to the tether gimbal assembly 542 at the proximate tether end 422, and one or more cables (or wires) may be connected to the proximate tether end 422. The one or more cables may connect the tether 420 to the slip ring 544.

F. Systems for Controlling Rotation and Twist of a Tether

Figure 6A:
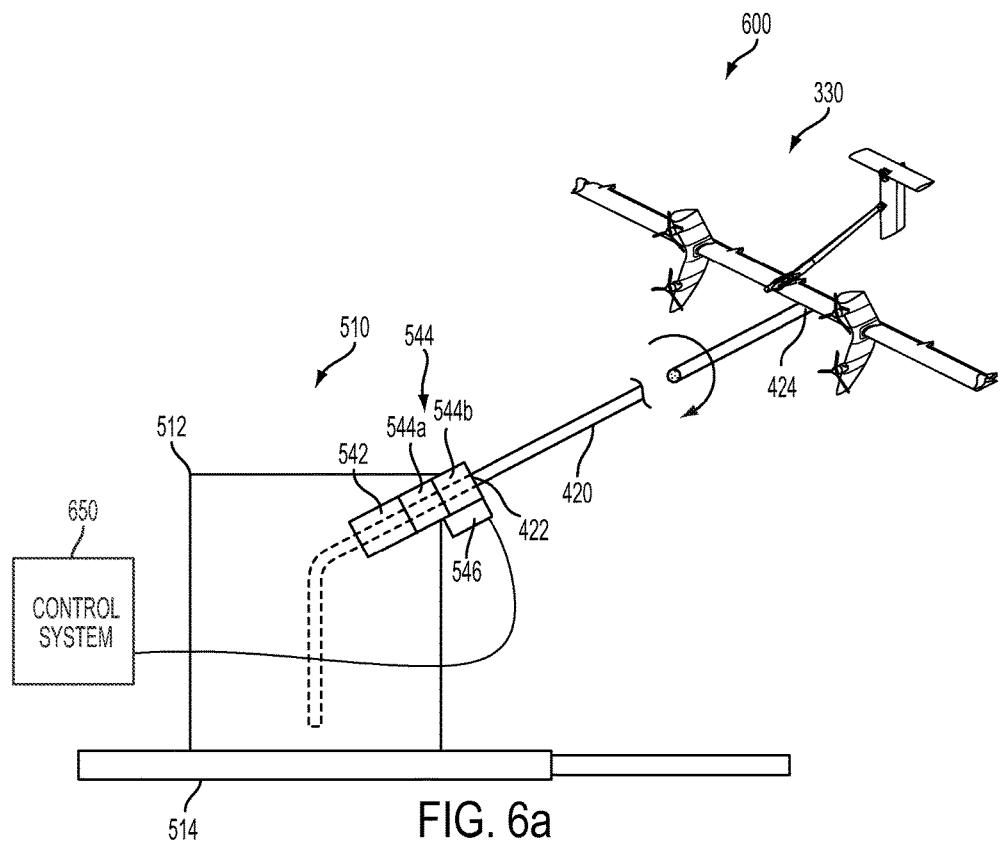
FIG. 6a depicts a system for controlling rotation and twist of a tether, according to an example embodiment.

FIG. 6a depicts a system 600 for controlling rotation and twist in the tether 420, according to an example embodiment. In particular, the system 600 includes a control system 650. Referring to FIG. 6a, the tether 420 may be coupled to a tether gimbal assembly 542 at the proximate tether end 422 and to the aerial vehicle 330 at the distal tether end 424. Additionally or alternatively, the tether 420 may pass through the tether gimbal assembly 542. Moreover, as shown in FIG. 6a, the tether gimbal assembly 542 may be coupled to the winch drum 512 which in turn may be coupled to the platform 514, the rotatable portion 544b of the slip ring 544 may be coupled to the tether 420, the fixed portion 544a of the slip ring 544 may be coupled to the tether gimbal assembly 542, and drive mechanism 546 may be coupled to the rotatable portion 544b. For example, the tether 420, the slip ring 544, the tether gimbal assembly 542 connections, as well as other connections, may be as described with respect to FIG. 5a.

Alternatively, the fixed portion 544a of the slip ring 544 may be coupled to the platform 514, the winch drum 512, or another component of the ground station 510 as described with reference to FIG. 5b. For example, the tether 420, the slip ring 544, the tether gimbal assembly 542 connections, as well as other connections, may be described with respect to FIG. 5b.

The control system 650 is configured to control operation(s) of the system 600 and its components. In some embodiments, the control system 650 may be configured to perform one or more functions described herein. For example, in some embodiments, the control system 650 may be configured to operate the drive mechanism 546 to control twist in the tether 420. In the illustrated embodiment, the control system 650 is connected to at least the drive mechanism 546, though other alternative or additional connections are possible, including but not limited to the tether 420, the slip ring 544, and the aerial vehicle 330. With this arrangement, an amount of twist in the tether 420 during crosswind flight of the aerial vehicle 330 may be actively controlled. In some examples, the control system 650 may be connected to at least one component by a wired connection or a wireless connection.

The control system 650 may be similar in form to the control system 248. For instance, the control system 650 may be implemented with mechanical systems and/or with hardware, firmware, and/or software. As one example, the control system 650 may take the form of program instructions stored on a non-transitory computer readable medium and a processor that executes the instructions. The control system 650 may be implemented in whole or in part on the ground station 510 and/or at least one entity remotely located from the ground station, such as the aerial vehicle 330. Generally, the manner in which the control system 650 is implemented may vary, depending upon the particular application.

Figure 6B:
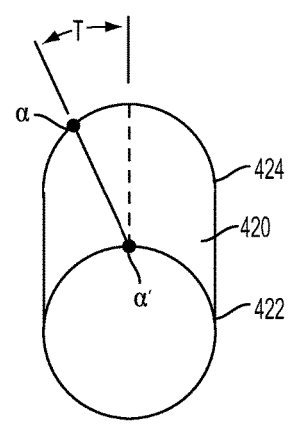
FIG. 6b depicts a foreshortened view of a tether section, according to an example embodiment.

FIG. 6b depicts a foreshortened view of the tether 420, according to an example embodiment. As noted, in some embodiments, an amount of twist T in the tether 420 may be measured as an angular distance between a point α on the tether 420 at the distal tether end 424 and a point α' on the tether 420 at the proximate tether end 422. Alternatively or additionally, the amount of twist in the tether may be measured between points along the tether other than a and a'. For example, the amount of twist may be measured along a portion of the tether 420 near the proximate end 422 or the distal end 424, or over multiple portions of the tether 420. In any case, the control system 650 may be configured to operate the drive mechanism 546 to control the amount of twist.

Further, in some embodiments, it may be desirable for the twist in the tether 420 to be positive. This may be accomplished by maintaining a rate of rotation in the proximate tether end 422 via the drive mechanism 546 such that the proximate tether end 422 is twisted a fixed or variable amount towards the direction of aerial vehicle 330 orbit beyond a natural state of the tether 420 (for example, when no torque or tension is applied via a drive mechanism and the proximate end 422 is allowed to rotate freely via a free-running slip ring). This may be referred to as a lead mode. In such embodiments, the control system 650 may be configured to operate the drive mechanism 546 in the lead mode.

Further still, in some embodiments, it may be desirable for the twist in the tether 420 to be negative. This may be accomplished by maintaining a rate of rotation in the proximate tether end 422 via the drive mechanism 546 such that the proximate tether end 422 is twisted a fixed or variable amount away from the direction of rotation, although the proximate tether end 422 may still be rotating in the direction of the aerial vehicle 330 orbit. This may referred to as a lag mode. In such embodiments, the control system 650 may be configured to operate the drive mechanism 546 in the lag mode.

In addition, in some embodiments, the control system 650 may be configured to operate the drive mechanism at variable speeds, fixed speeds, or in an on/off fashion in order to maintain the desired twist within a certain operating range. For example, the control system 650 may be configured to maintain the tether 420 twist within a range of values by activating and deactivating the drive mechanism 546 (e.g., pulsing a drive motor attached to the slip ring). As another example, the control system 650 may be configured to maintain the tether 420 twist within a range of values by causing the drive mechanism 546 to rotate the rotatable portion 544b at a constant rate. As yet another example, the control system 650 may be configured to maintain the tether 420 twist within a range of values by causing the drive mechanism 546 to rotate the rotatable portion 544b at a variable rate. In such examples, the variable rate may be determined in reference to at least the rotational rate of the tether 420. For instance, in at least one such example, the variable rate may be determined in reference to at least the rotational rate of the distal tether end 424 or a rotational speed of the aerial vehicle 330. Further, in at least one such example, the variable rate may be determined in reference to at least the rotational rate of the proximate tether end 422.

Moreover, in some embodiments, the control system 650 may be configured to determine one or more operational or environmental parameters that affect an AWT, such as AWT 100 and/or AWT 200, and then control the amount of twist in the tether 420 based at least in part on the determined parameter. As examples, the parameters may include tether 420 tension, position of the aerial vehicle 330, load(s) on the aerial vehicle 330, velocities of the aerial vehicle 330, wind speed(s), temperature of a tether 420 conductor, environmental temperature, conductor resistance, and/or current flowing in a conductor. For example, by increasing or decreasing the twist in the tether 420, tension in the tether 420 can be increased or decreased. And in at least one such embodiment, when the tether 420 includes two or more layers, it may be desirable to maintain a relative tension between the layers of the tether 420. The control system 650 may determine the parameters at least in part by information provided by any of the sensors 232 of the aerial vehicle 230.

Although system 600 has been described above, other example systems are possible as well. For example, although the drive mechanism 546 is coupled to the rotatable portion 544b of the slip ring 544 in the system 600, in other example systems the drive mechanism 546 may not be coupled to the rotatable portion 544b. Instead, in some embodiments, the drive mechanism 546 may be coupled to a portion of the tether 420. In such embodiments, the drive mechanism 546 may be configured to rotate the coupled portion of the tether 420.

Although in system 600 the slip ring 544 is coupled to the tether gimbal assembly 542 or the ground station 510, in other example systems the slip ring 544 may be coupled instead to the aerial vehicle 330. For instance, in some embodiments, the fixed portion 544a of the slip ring 544 may be coupled to the aerial vehicle 330, the rotatable portion 544b of the slip ring 544 may be coupled to the distal tether end 424, and the drive mechanism 546 may be coupled to the rotatable portion 544b. Moreover, in an example system where the slip ring 544 is coupled to the aerial vehicle 330, the system may not include the tether gimbal assembly 542. Instead, in some embodiments, the proximate tether end 422 may be coupled to the winch drum 512.

As yet another example, although system 600 includes the drive mechanism 546, other example systems may include two or more drive mechanisms coupled to the slip ring 544. Beneficially, such redundancy may improve the reliability of the system. In some embodiments, each drive mechanism of the two or more drive mechanisms may take the form of or be similar in form to the drive mechanism 546.

Figure 7:
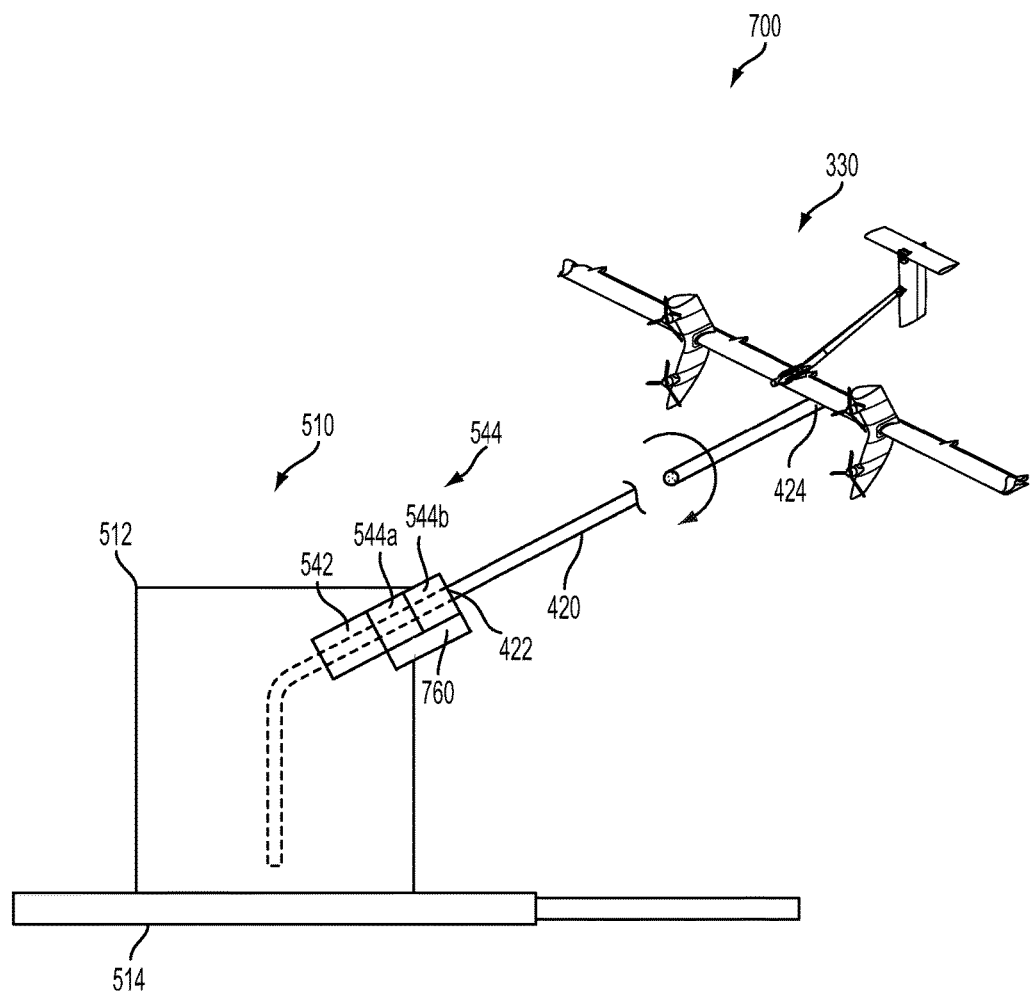
FIG. 7 depicts a system for controlling rotation and twist of a tether, according to an example embodiment.

FIG. 7 depicts another system 700 for controlling rotation and twist of the tether 420, according to an example embodiment. In particular, the system 700 includes a resistive bearing system 760. The resistive bearing system 760 may passively control an amount of twist in the tether 420 during crosswind flight. Referring to FIG. 7, the tether 420 may be coupled to the tether gimbal assembly 542 at the proximate tether end 422 and to the aerial vehicle 330 at the distal tether end 424. Additionally or alternatively, the tether 420 may pass through the tether gimbal assembly 542. Moreover, as shown in FIG. 7, the tether gimbal assembly 542 may be coupled to the winch drum 512 which in turn is coupled to the platform 514, the rotatable portion 544b of the slip ring 544 may be coupled to the tether 420, the fixed portion 544a of the slip ring 544 may be coupled to the tether gimbal assembly 542, and the resistive bearing system 760 may be coupled to the slip ring 544 and/or the tether gimbal assembly 542.

Alternatively, the fixed portion 544a of the slip ring 544 may be coupled to the platform 514, the winch drum 512, or another component of the ground station 510. For example, the tether 420, the slip ring 544, the tether gimbal assembly 542 connections, as well as other connections, may be described with respect to FIG. 5b.

In some embodiments, the resistive bearing system 760 may be configured to allow the rotatable portion 544b to rotate relative to the fixed portion 544a when a torque provided by the tether 420 exceeds a slip limit, and may be further configured to inhibit the rotation of the rotatable portion 544b relative to the fixed portion 544a when the torque provided by the tether 420 does not exceed the slip limit. In other embodiments, the resistive bearing system 760 may be configured to allow the proximate tether end 422 to rotate when a torque at the proximate tether end 422 exceeds a slip limit, and may be further configured to inhibit the rotation of the proximate tether end 422 when the torque does not exceed the slip limit.

Moreover, in some embodiments, the slip limit may be based on any of the parameters of the tether 420, the aerial vehicle 330, and/or the environment as described herein. Further, in some embodiments, the tether 420 may include fibers (not shown) at a lay angle that is less than any helical lay angle of conductor(s) of the tether 420. As such, the fibers may provide torque to drive or assist driving the resistive bearing system 760. Further still, in some embodiments, the tether 420 may include fibers at a lay angle that is equal to or greater than any helical lay angle of conductor(s) of the tether 420. As such, the fibers may provide torque to drive or assist driving the resistive bearing system 760.

Further, in some embodiments, the resistive bearing system 760 may include a brake (not shown) and the brake may be configured to inhibit the rotation of the rotatable portion 544b relative to the fixed portion 544a, for example, when the torque provided by the tether 420 does not exceed the slip limit.

Further still, in some embodiments, the resistive bearing system 760 may be configured to allow the rotatable portion 544b of the slip ring 544 to rotate relative to the fixed portion 544a and to provide a resistance to the rotational torque of the tether 420 so as to maintain the twist in the tether 420 within a determined range of values. Moreover, in some embodiments, the resistance to the rotational torque of the tether 420 provided by the resistive bearing system 760 may be based on any of the parameters of the tether 420, the aerial vehicle 330, and/or the environment as described herein. In other embodiments, the resistive bearing system 760 may be configured to allow the proximate tether end 422 to rotate and to provide a resistance to the rotational torque of the tether 420 so as to maintain the twist in the tether 420 within a determined range of values.

In addition, in some embodiments, a resistance of the resistive bearing system 760 may vary based on any parameters of the tether 420, the aerial vehicle 330, and/or the environment as described herein. For example, a friction brake may be used to vary the resistance of the resistance bearing system 760.

Although system 700 has been described above, other example systems are possible as well. For example, although the resistive bearing system 760 is coupled to the slip ring 544 and/or the tether gimbal assembly 542 in the system 700, in other example systems the resistive bearing system 760 may not be coupled to the slip ring 544 and/or the tether gimbal assembly 542. Instead, in some embodiments, the resistive bearing system 760 may be coupled to a portion of the tether 420. In such embodiments, the resistive bearing system 760 may be configured to allow the coupled portion of the tether 420 to rotate when a torque at the coupled portion of the tether 420 exceeds a slip limit, and may be further configured to inhibit the rotation of the coupled portion of the tether 420 when the torque does not exceed the slip limit. Alternatively, in such embodiments, the resistive bearing system 760 may be configured to allow the coupled portion of the tether 420 to rotate and to provide a resistance to the rotational torque of the tether 420 so as to maintain the twist in the tether 420 within a determined range of values.

G. Illustrative Tethers

Figure 8:
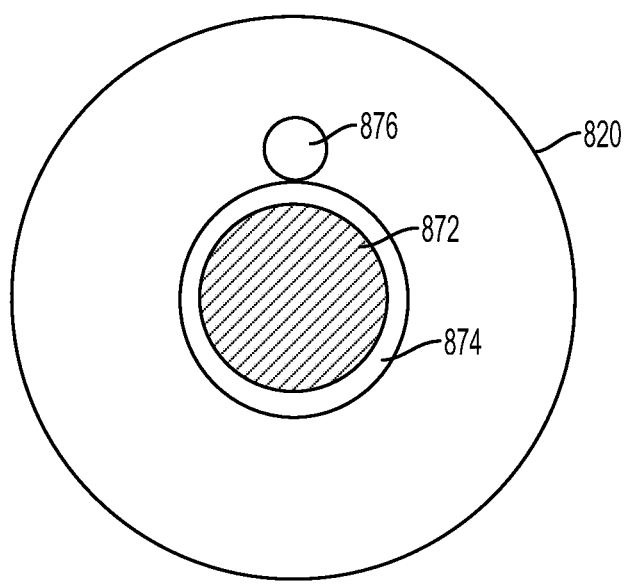
FIG. 8 depicts a tether in cross-section, according to an example embodiment.

FIG. 8 depicts a cross-section of a tether 820, according to an example embodiment. The tether 120, the tether 220, and/or the tether 420 may take the form of or be similar in form to the tether 820. The tether 820 includes a core 872, at least one compliant layer 874, and at least one conductor 876. As shown in FIG. 8, the compliant layer 874 is located between the core 872 and the conductor 876. The core 872 may be configured to withstand a strain load, for example, of between 0.8% and 1.0%. In some embodiments, the conductor 876 may be configured to withstand less strain than the core 872.

The conductor 876 may be helically wound around a length of the core 872. With this arrangement, strain on the conductor 876 may be reduced during normal operation. In addition, when the tether 820 is twisted, the conductor 876 may compress into the compliant layer 874. With this arrangement, strain on the conductor 876 may be further reduced.

When the tether 820 is twisted, a helically wound conductor 876 may be in tension or compression. For example, when the direction of twist of the tether 820 corresponds to the conductor's 876 helical winding, the conductor 876 may be in tension. And when the direction of the twist is in opposition to the conductor's 876 helical winding, the conductor 876 may be in compression.

Although the tether 820 has been described above as including the conductor 876, other example tethers may include a conductor layer having two or more conductors. In some embodiments, each conductor of the two or more conductors may take the form of or be similar in form to the conductor 876. Moreover, in some embodiments, each conductor of the two or more conductors may be helically wound around a length of the core 872.

Further, although the tether 820 has been described above as including the compliant layer 874, other example tethers may not include a complaint layer.

Figure 9:
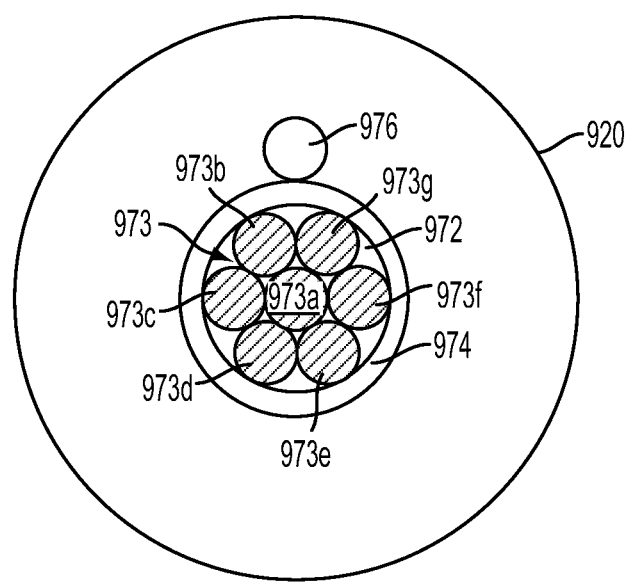
FIG. 9 depicts a tether in cross-section, according to an example embodiment.

FIG. 9 depicts a cross-section of another tether 920, according to an example embodiment. The tether 120, the tether 220, and/or the tether 420 may take the form of or be similar in form to the tether 920. In particular, the tether 920 includes a core layer 972 having two or more core elements 973. The tether 920 may include the core layer 972, a complaint layer 974, and at least one conductor 976. The compliant layer 974 may take the form of or be similar in form to the compliant layer 874, and the conductor 976 may take the form of or be similar in form to the conductor 876.

As shown in FIG. 9, the complaint layer 974 is located between the core layer 972 and the conductor 976. The conductor 976 may be helically wound around a length of the core layer 972 in the same or similar way as the conductor 876 may be helically wound around a length of the core 872 in the tether 820. In addition, the tether 920 may include two or more conductors in the same or similar way as the tether 820 may include two or more conductors.

As noted, the core layer 972 includes two or more elements 973. In the illustrated example, the two or more core elements 973 may include seven core elements: a first core element 973a, a second core element 973b, a third core element 973c, a fourth core element 973d, a fifth core element 973e, a six core element 973f, and a seventh core element 973g. However, in other examples, the two or more core elements 973 may include more than seven core elements or less than seven core elements. Moreover, in some embodiments, each core element may be the same or similar. However, in some embodiments, at least one core element may have a different material, thickness, length, lay angle, etc.

Further, in some embodiments, at least one core element may be helically wound around a length of the tether 920. With this configuration, the core layer 972 may have a lower polar moment of inertia than a polar moment of inertia of the core 872. Beneficially, the core layer 972 may allow for a greater amount of twist in the tether 920 than allowed by core 872 in tether 820. Further still, in some embodiments, at least one core element may include a carbon rod and the core layer 972 may be configured to provide torque to drive a resistive bearing system, such as the resistive bearing system 760.

Figure 10:
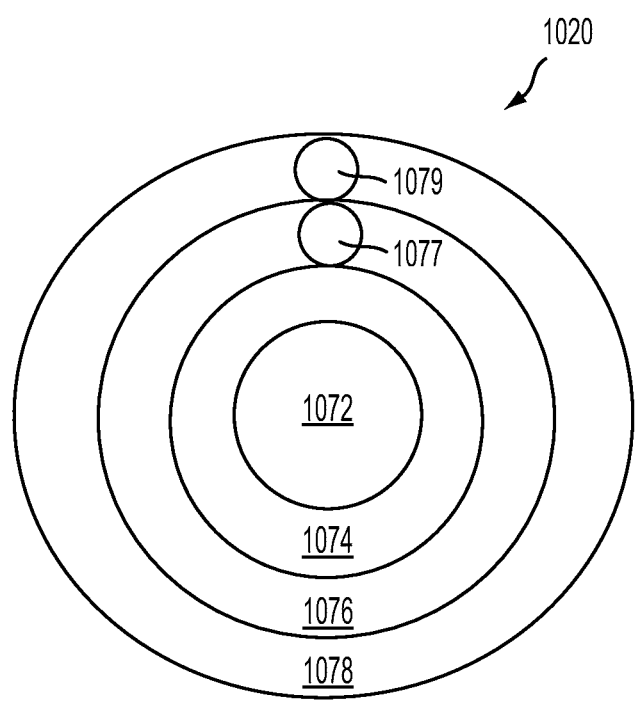
FIG. 10 depicts a tether in cross-section, according to an example embodiment.

FIG. 10 depicts a cross-section of yet another tether 1020, according to an example embodiment. In particular, the tether 1020 includes a torque layer 1078 having at least one fiber 1079. The tether 120, the tether 220, and/or the tether 420 may take the form of or be similar in form to the tether 1020. The tether 1020 includes a core 1072, a complaint layer 1074, a conductor layer 1076, and the torque layer 1078. The conductor layer 1076 may include at least one conductor 1077. The core 1072 may take the form of or be similar in form to the core 872 or the core layer 972, the complaint layer 1074 may take the form of or be similar in form to the complaint layer 874 and/or the complaint layer 974, and the conductor 1077 may take the form of or be similar in form to the conductor 876 and/or the conductor 976.

As shown in FIG. 10, the complaint layer 1074 is located between the core 1072 and the conductor layer 1076. Moreover, as shown in FIG. 10, the core 1072, the complaint layer 1074, and the conductor layer 1076 may be located inside of the torque layer 1078. The conductor 1077 may be helically wound around a length of the core 1072 in the same or similar way as the conductor 876 may be helically wound around a length of the core 872 in the tether 820 and the conductor 976 may be helically wound around a length of the core layer 972 of the tether 920. In addition, the tether 1020 may include two or more conductors in the same or similar way as the tether 820 may include two or more conductors and the tether 920 may include two or more conductors.

As noted, the tether 1020 includes the torque layer 1078 having the fiber 1079. In some embodiments, the fiber 1079 may be helically wound around a length of the tether 1020 over the conductor layer 1076. With this configuration, the fiber 1079 may be configured to provide torque to drive a resistive bearing system, such as the resistive bearing system 760. As an example, the fiber 1079 may include carbon or any suitable material configured to drive the resistive bearing system.

In such embodiments, the fiber 1079 may be helically wound in the direction that an aerial vehicle, such as the aerial vehicle 130, the aerial vehicle 230, and/or the aerial vehicle 330, rotates during crosswind flight (e.g., right-handed direction). As the tether twists, the helically wound fiber 1079 will create torque by virtue of a winding/unwinding force. Further, in such embodiments, a lay angle of the fiber 1079 may be based at least in part on one or more parameters, including friction in the resistive bearing system, stiffness of the fiber 1079, the compressibility (e.g., bulk modulus) of the tether 1020, allowable strain in the conductor 1077, and alternating tension of the tether 1020. Further still, in such embodiments, a lay angle of the fiber 1079 may be less than a lay angle of the conductor 1077.

Moreover, in some embodiments, at least one parameter of the torque layer 1078 may be selected so as to increase or decrease a tensile strength of the tether 1020. In such embodiments, at least one parameter of the fiber 1079 may be selected so as to increase or decrease a tensile strength of the tether 1020. Further, in some embodiments, at least one parameter of the torque layer 1078 may be selected so as to increase or decrease a stiffness of the tether 1020. In such embodiments, at least one parameter of the fiber 1079 may be selected so as to increase or decrease a stiffness of the tether 1020.

Although the torque layer 1078 has been described above as having the fiber 1079, other example tethers may have two or more fibers. In some embodiments, each fiber of the two or more fibers may take the form of or be similar in form to the fiber 1079. Moreover, in some embodiments, each fiber of the two or more fibers may be helically wound around a length of the tether 1020. Further, in such embodiments, a corresponding lay angle of each fiber of the two or more fibers may be less than a lay angle of the conductor 1020.

Moreover, although the tether 1020 has been described above with the core 1072, the compliant layer 1074, and the conductor layer 1076 being located inside of the torque layer 1078, in other example tethers, the torque layer 1078 may be located between the core layer 1072 and the conductor layer 1076 (e.g., between the compliant layer 1074 and the conductor 1077). In some embodiments, the fiber 1079 may be helically wound around a length of the tether 1020 over the core 1072.

III. ILLUSTRATIVE METHODS

Figure 11:
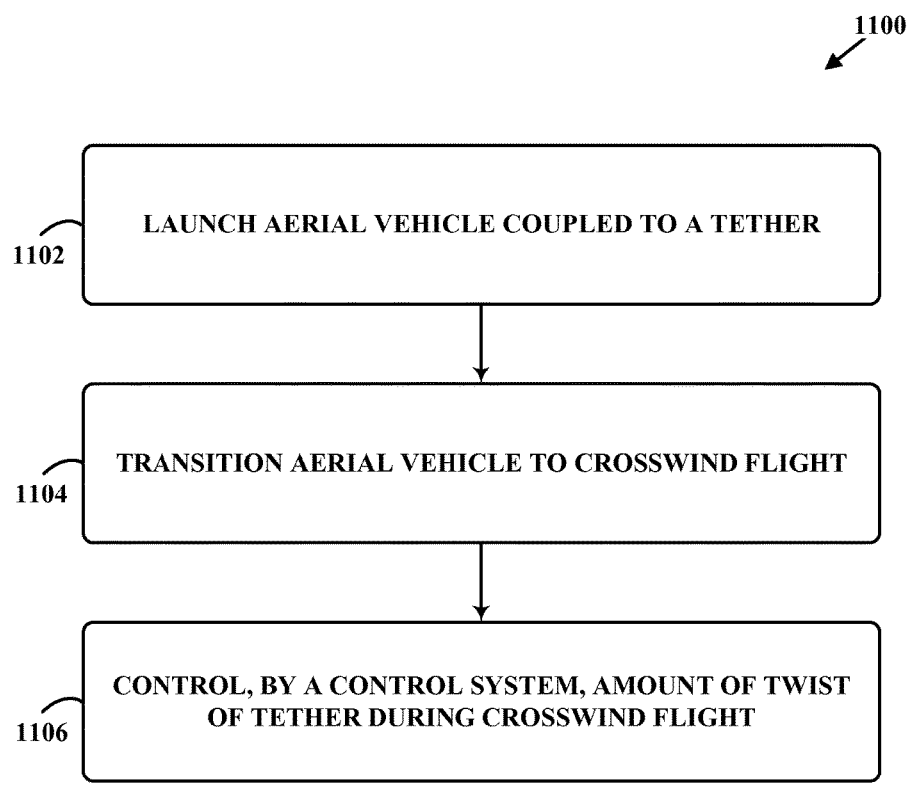
FIG. 11 is a flow chart illustrating a method, according to an example embodiment.

FIG. 11 is a flowchart illustrating a method 1100, according to an example embodiment. Illustrative methods, such as method 1100, may be carried out in whole or in part by a component or components of an AWT, such as by the one or more components of the AWT 100 shown in FIG. 1, and the AWT 200 shown in FIG. 2.

As shown by block 1102, the method 1100 may involve launching an aerial vehicle connected to a tether. The aerial vehicle may take form of or be similar in form to the aerial vehicle 130, the aerial vehicle 230, and/or the aerial vehicle 330. The tether may take the form of or be similar in form to the tether 120, the tether 220, the tether 420, the tether 820, the tether 920, and the tether 1020.

As shown by block 1104, the method 1100 may involve transitioning the aerial vehicle to crosswind flight. In some embodiments, the aerial vehicle may transition to crosswind flight via hover flight and/or forward flight.

As shown by block 1106, the method 1100 may involve controlling, by a control system, an amount of twist in the tether during crosswind flight. The control system may take the form of or be similar in form to the control system 248 and/or the control system 650.

In some embodiments, a drive mechanism is coupled to the tether, and controlling, by the control system, the amount of twist in the tether during crosswind flight may involve operating a drive mechanism in a lag mode. Moreover, in some embodiments, a drive mechanism is coupled to the tether, and controlling, by the control system, the amount of twist in the tether during crosswind flight may involve operating a drive mechanism in a lead mode. Further, in some embodiments, a drive mechanism is coupled to the tether, and controlling, by the control system, the amount of twist in the tether during crosswind flight may involve activating and deactivating the drive mechanism.

Further still, in some embodiments, a rotatable portion of a slip ring is coupled to the tether, a drive mechanism is coupled to the rotatable portion, and controlling, by the control system, the amount of twist in the tether during crosswind flight may involve causing the drive mechanism to rotate a rotatable portion of the slip ring coupled to the tether at a constant rate.

Moreover, in some embodiments, a rotatable portion of a slip ring is coupled to the tether, a drive mechanism is coupled to the rotatable portion, and controlling, by the control system, the amount of twist in the tether during crosswind flight may involve causing the drive mechanism to rotate the rotatable portion of the slip ring at a variable rate. And in at least one such embodiment, the variable rate may be determined in reference to at least the rotational rate of the tether.

Further, in some embodiments, a drive mechanism is coupled to a tether, and the method 1100 may further involve determining the value of an operational or environmental parameter and operating the drive mechanism to control tether twist based at least in part on the determined operational or environmental parameter. And in at least one such embodiment, the operational or environmental parameter comprises a tension on the tether, a load on the aerial vehicle, a position of the aerial vehicle, a velocity of the aerial vehicle, a wind speed, a temperature of the at least one conductor, an environmental temperature, a resistance of the at least one conductor, or the amount of electrical current carried by the at least one conductor.

IV. CONCLUSION

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are contemplated herein.

What is claimed is:

1. A system comprising:
   a tether comprising:
      a distal tether end coupled to an aerial vehicle;
      a proximate tether end; and
      at least one insulated electrical conductor coupled to the aerial vehicle, wherein the tether has an amount of twist between the distal tether end and the proximate tether end;
   a slip ring comprising a fixed portion and a rotatable portion, wherein the rotatable portion is coupled to the tether;
   a tether gimbal assembly, wherein the tether gimbal assembly is rotatable about at least a horizontal axis or an azimuth axis and is coupled to the fixed portion of the slip ring; and
   a control system, wherein the control system operates a drive mechanism coupled to the rotatable portion of the slip ring at the proximate tether end to rotate the rotatable portion of the slip ring relative to the fixed portion of the slip ring to change the amount of twist in the tether.

2. The system of claim 1, wherein the control system operates the drive mechanism in a lag mode.

3. The system of claim 1, wherein the control system operates the drive mechanism in a lead mode.

4. The system of claim 1, wherein the control system operates the drive mechanism by activating and deactivating the drive mechanism.

5. The system of claim 1, wherein the control system operates the drive mechanism by causing the drive mechanism to rotate the rotatable portion of the slip ring at a constant rate.

6. The system of claim 1, wherein the control system operates the drive mechanism by causing the drive mechanism to rotate the rotatable portion of the slip ring at a variable rate.

7. The system of claim 6, wherein the variable rate is determined in reference to at least a rotational rate of the tether.

8. The system of claim 1, wherein the control system determines the value of an operational or environmental parameter; and operates the drive mechanism to change the amount of twist in the tether based at least in part on the determined operational or environmental parameter.

* * * * *